United States Patent
Kim et al.

(10) Patent No.: US 12,554,303 B2
(45) Date of Patent: Feb. 17, 2026

(54) DYNAMIC CHARGE RATE CONTROL OF BATTERY POWERED DEVICES

(71) Applicant: Microsoft Technology Licensing, LLC, Redmond, WA (US)

(72) Inventors: Donghwi Kim, Kirkland, WA (US); Gregory Allen Nielsen, Kirkland, WA (US); Minsoo Kim, Bothell, WA (US); Rajagopal K. Venkatachalam, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 18/544,816

(22) Filed: Dec. 19, 2023

(65) Prior Publication Data

US 2025/0199594 A1   Jun. 19, 2025

(51) Int. Cl.
*G06F 1/26* (2006.01)
*H02J 7/00* (2006.01)

(52) U.S. Cl.
CPC ............ *G06F 1/263* (2013.01); *H02J 7/0013* (2013.01); *H02J 7/0048* (2020.01)

(58) Field of Classification Search
CPC ........ G06F 1/263; H02J 7/0048; H02J 7/0013
See application file for complete search history.

(56) References Cited

U.S. PATENT DOCUMENTS

| | | | |
|---|---|---|---|
| 6,286,109 B1 | 9/2001 | Pirdy | |
| 11,984,749 B2 * | 5/2024 | Venkatraman | H02J 7/0044 |
| 12,081,047 B2 * | 9/2024 | Venkatraman | H02J 50/12 |
| 2002/0152406 A1 | 10/2002 | Watts et al. | |
| 2009/0134836 A1 * | 5/2009 | Zhao | H02J 7/342 320/103 |
| 2012/0324578 A1 * | 12/2012 | Seinfeld | G06F 1/3206 713/340 |
| 2016/0079777 A1 * | 3/2016 | Bhardwaj | H01M 10/443 320/153 |
| 2016/0276860 A1 * | 9/2016 | Yebka | H01M 10/425 |
| 2017/0025874 A1 * | 1/2017 | Lei | H02J 7/0048 |
| 2017/0214264 A1 * | 7/2017 | Wang | H01M 10/44 |
| 2017/0373522 A1 * | 12/2017 | Pelosi | H02J 7/0013 |

(Continued)

OTHER PUBLICATIONS

"Thermal Challenges For In-Cabin Wireless Charging Systems: Improving Performance Through Charging Profile Optimization", Retrieved From: https://powermat.com/blog/thermal-challenges-for-in-cabin-wireless-charging-systems-improving-performance-through-charging-profile-optimization/, Mar. 7, 2022, 9 Pages.

(Continued)

*Primary Examiner* — Aurel Prifti

(57) ABSTRACT

Techniques, software, and systems for enhanced management of computing system battery charge rates are included. In one implementation, a method includes identifying a preference level for battery charging performance for a computing system when supplied by a power supply having a power supply capacity. Based at least on the preference level, the method includes allocating the power supply capacity to bias a primary allocation of the power supply capacity to charging operations of a battery of the computing system while providing a remainder allocation to at least a system processor of the computing system.

18 Claims, 7 Drawing Sheets

(56) References Cited

U.S. PATENT DOCUMENTS

| | | | | |
|---|---|---|---|---|
| 2018/0136708 A1* | 5/2018 | Jahagirdar | | G06F 1/3206 |
| 2019/0250689 A1* | 8/2019 | Ivanov | | G06F 1/3203 |
| 2020/0044458 A1* | 2/2020 | Yoon | | G06F 1/263 |
| 2021/0048870 A1* | 2/2021 | Lin | | G06F 1/3206 |
| 2021/0336464 A1* | 10/2021 | Fritz | | H02J 7/0048 |
| 2021/0353838 A1* | 11/2021 | Schilling | | A61N 1/3627 |
| 2022/0335910 A1 | 10/2022 | Bhat et al. | | |

OTHER PUBLICATIONS

Patel, et al., "Battery and Charging", Retrieved From: https://learn.microsoft.com/en-us/windows-hardware/design/component-guidelines/battery-and-charging, Jun. 21, 2022, 20 Pages.

Qian, Jinrong, "Li-Ion Battery-Charger Solutions For JEITA Compliance", In Journal of Analog Applications Journal, 2010, pp. 8-11.

* cited by examiner

| 400 → | CHARGING PREFERRED OR BALANCED W/BATTERY CHARGE LESS THAN X (or standby or screen off) 460 | BALANCED W/BATTERY CHARGE BETWEEN X AND Y 461 | BALANCED W/BATTERY CHARGE OVER Y OR PERFORMANCE PREFERRED 462 |
|---|---|---|---|
| NORMAL CHARGE 410 | TEMP 420 (SKINTEMP + OFFSET A) | TEMP 423 (SKINTEMP + OFFSET D) | TEMP 426 (SKINTEMP + OFFSET G) |
| SLOW CHARGE 411 | TEMP 421 (SKINTEMP + OFFSET B) | TEMP 424 (SKINTEMP + OFFSET E) | TEMP 427 (SKINTEMP + OFFSET H) |
| TRICKLE CHARGE 412 | TEMP 422 (SKINTEMP + OFFSET C) | TEMP 425 (SKINTEMP + OFFSET F) | TEMP 428 (SKINTEMP + OFFSET I) |
| POWER CAP 413 | FORMULA 440 | NO INFLUENCE | NO INFLUENCE |
| FAN SPEED 414 | Ramp to target sound pressure level at mid temp. target for battery | NO INFLUENCE | NO INFLUENCE |
| PROC. THROTTLE 415 | Hold battery temperature to upper temp. target | NO INFLUENCE | NO INFLUENCE |

FIG. 4

DYNAMIC CHARGE RATE CONTROL OF BATTERY POWERED DEVICES

BACKGROUND

Power management in computing systems which include battery systems, such as laptops or tablets, involves the implementation of strategies and features to efficiently control and regulate the consumption of electrical power, with the primary objective of extending battery life and optimizing energy usage. This encompasses a range of techniques, including adjusting a processor clock speed dynamically based on workload, controlling brightness of a display, and selectively powering down components during periods of inactivity. Operating systems often include power management settings that allow users to customize preferences, such as choosing between different power plans or profiles that balance processor performance. Additionally, laptops and other such devices may incorporate advanced power-saving features like sleep modes and hibernation, which temporarily reduce or suspend system activity to conserve power when the device is not in use. Effective power management is essential for users who rely on their laptops in mobile battery-powered scenarios.

SUMMARY

Various examples discussed herein relate to dynamic charge rate control and optimization for user devices which include batteries. In one implementation, a method includes identifying a preference level for battery charging performance for a computing system when supplied by a power supply having a power supply capacity. Based at least on the preference level, the method includes allocating the power supply capacity to bias a primary allocation of the power supply capacity to charging operations of a battery of the computing system while providing a remainder allocation to at least a system processor of the computing system.

In another example implementation, an apparatus includes a processing system operatively coupled with one or more computer readable storage media, and program instructions stored on the one or more computer readable storage media. Based at least on being read and executed by the processing system, the program instructions direct the processing system to at least identify a preference level for battery charging performance for a computing system when supplied by a power supply having a power supply capacity. Based at least on the preference level, the program instructions direct the processing system to allocate the power supply capacity to bias a primary allocation of the power supply capacity to charging operations of a battery of the computing system while providing a remainder allocation to at least a system processor of the computing system. The program instructions can direct the processing system to apply an increased temperature limit associated with an exterior surface temperature of the computing system to maintain the primary allocation for charging operations of the battery.

In yet another example implementation, a system includes a user interface configured to identify a preference level for battery charging performance for a computing system when supplied by a power supply having a power supply capacity. The system also includes a power control system configured to, based at least on the preference level, allocate the power supply capacity to bias a primary allocation of the power supply capacity to charging operations of a battery of the computing system while providing a remainder allocation to at least a system processor of the computing system. The program instructions can direct the processing system to apply an increased temperature limit associated with an exterior surface temperature of the computing system to maintain the primary allocation for charging operations of the battery.

This summary is provided to introduce a selection of concepts in a simplified form that are further described below in the detailed description. It may be understood that this summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a data structure to manage charge rates and temperatures for a computing system in an implementation.

DETAILED DESCRIPTION

Figure 1:
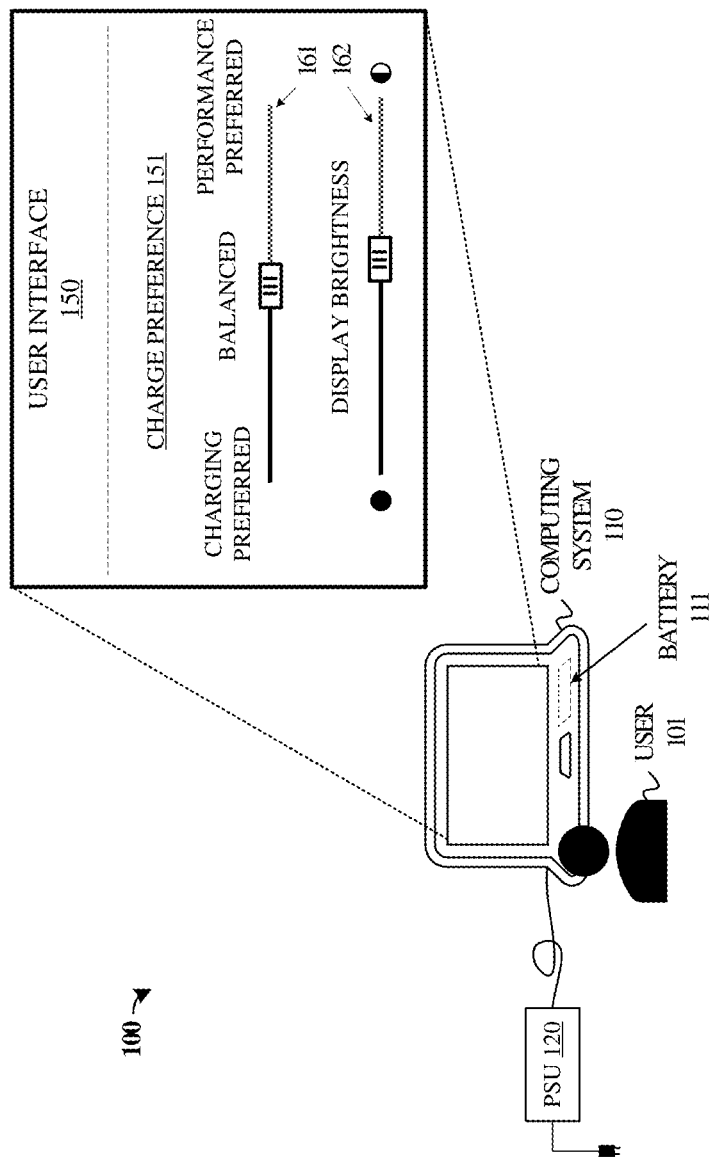
FIG. 1 illustrates a computing environment to provide charge rate control on a computing system in an implementation.

Mobile device charging involves replenishing a battery of electronic devices, such as used in various computing systems, laptops, smartphones, tablets, or wearables. A common method of charging is through a power supply unit (PSU) or power adapter that connects to a power source, such as an electrical outlet, and then converts and transfers electrical energy to a device battery through a charging cable. This process can include wired connections over a proprietary power connection, or instead this power connection may conform to a standard power interface, such as promulgated under the USB (Universal Serial Bus) set of standards. In some examples, computing systems employ wireless charging that enables the transfer of power from a charging pad or station to a device without the need for physical cables. Wireless charging relies on changing electric/magnetic fields to transmit energy, allowing for cord-free charging of compatible devices.

However, while battery-powered computing systems provide power management which adjusts system performance or power usage when on battery power, difficulties arise in managing charging of the batteries after the computing system is connected to a power supply. Specifically, with advancements in compute power and fast charging techniques, various system limitations can slow the charging of batteries, leading to less charge being available for portable use or battery-powered situations.

In computing systems, software can enable the computing system to optimize and control the power usage on the device. The software can permit a user of the system to monitor, schedule, and adjust power setting to enhance energy efficiency, extend battery life, or enhance/reduce overall performance or power consumption of the computing system. In the present implementations, to further assist with battery and charging management on a computing system, software can be used to selectively and dynamically control a charge rate associated with the battery of the computing system. The software can provide user interface elements indicating different battery charging preference options for a user. These options can include options that prioritize faster charging associated with the battery of the computing system, options that provide a balanced power charging strategy for the battery of the computing system (i.e., balance processor performance and battery charging rate), and options that prioritize processor performance of the computing system over battery charging of the computing system.

For example, a user of the computing system can provide input indicating a request to prioritize battery charging over the processing operations of the computing system. In response to the request, the software can determine a target power budget allocated to a battery charging operation for the computing system and apply the target power budget on the computing system. In determining the target power budget allocated to the battery charging operation for the computing system, the software may consider a variety of factors. The factors include a present maximum charge rate for the battery, a present maximum power supplied from the power supply unit (PSU), a present charge level status of the battery, various temperatures associated with the battery, main system processor, or other portions of the chassis (e.g., skin temperature or enclosure exterior temperature), or other factors.

Once the target power budget allocated to the battery charging operation is identified, the software allocates the target power budget to the battery and allocates at least a portion of the remaining power budget available from the power supply to the other elements of the computing system, such as the main system processor, data storage elements, displays, and various peripheral elements. This operation is considered 'biasing' or preferentially allocating a portion of the total available power to the battery charge operations, while giving a remainder of the total available power to other portions of the computing system not involved in providing charge to the battery.

During charging operations, control software can monitor various operational parameters and metrics or aspects of the computing system, such as temperatures measured by one or more sensors in the computing system. In some examples, the sensors are configured to sense temperatures for exterior locations of a device enclosure which are near touch locations for the user, such as near a keyboard, palm rest, rear of a tablet device, or bottom of a computing device. The sensors further can include battery temperature sensors that indicate an internal temperature of the battery or various battery cells forming a battery module. The control software can determine when a particular temperature satisfies a threshold associated with the selected user preference option and determine a mitigation operation to ensure that the user preference is maintained as closely as feasible. Mitigation operations can include initial mitigation operations such as adjusting temperature thresholds which allow additional fast charge rates for batteries for additional timeframes. Mitigation operations can also include subsequent mitigation operations, which may be enacted when the initial mitigation operations are exhausted. These subsequent mitigation operations include attempting to reduce corresponding temperatures, such as changing cooling fan speeds in the computing device, adjusting operation of thermal regulation devices of the computing system, throttling main system processor clock speed, overall system performance throttling, changing power allocations to the main system processor, changing the charge rate provided to the battery, or providing other mitigation operations based at least on the charge rate preferences selected by the user.

In some implementations, each of the preferences are associated with different temperature threshold adjustments and other mitigation operations. For example, when charging preferred is selected by the user, the temperature thresholds can be adjusted higher to bias available system power for the desired charge rate of the battery. Alternatively, when the user indicates that performance is preferred, the temperature thresholds can be adjusted to default values or lower values to bias available system power toward providing the highest performance (e.g., power or clock speed) to the main system processor at the expense of the charging rate provided to the battery.

In at least one example, when charging preferred is selected, the computing system identifies a total capacity of power from the power supply and allocates the power of the power supply to prioritize or bias charging of the computing system. In at least one implementation, the computing system determines a preferred charge rate for the battery based at least on current battery charge, temperature of the battery, or some other factor. Once identified, the computing system attempts to provide the preferred charge rate from the power of the power supply to charge the battery and provide remaining power to the CPU or other systems on the computing system. The computing system will ensure that the CPU is provided at least a minimum processor power state and will reduce the charge to the battery if required. The charge and CPU power bias can be modified over time as the desired charge rate for the battery changes (e.g., battery increases charge). Additionally, when the temperatures increase in association with sensors on the computing system, the computing system identifies when thresholds are exceeded and can reduce clock speed of the main system processor to provide temperature mitigation and maintain the charge rate to the battery. Other mitigation and performance adjustment techniques will be discussed below.

Turning now to various enhanced implementations of techniques, software, systems, and apparatus elements, FIG. 1 is presented. FIG. 1 illustrates computing environment 100 to provide battery charge rate control on a computing system in an implementation. Computing environment 100 includes computing system 110 with battery 111, user 101, power supply unit (PSU) 120, and user interface 150 presented on computing system 110. User interface 150 can include various user interface elements, such as graphical user interfaces, but in this example a specific implementation includes charge preference element 151 that includes charge preference slider 161 and display brightness slider 162.

Computing system 110 is representative of a battery-powered user device, such as a laptop, tablet, smartphone, or some other computing system. Computing system 110 includes battery 111 comprising one or more rechargeable battery cells and associated charge control and battery maintenance circuitry. Computing system 110 can receive source power supplied by PSU 120 over a wired or wireless link, which can supply operating power to computing system 110. In addition to operational power for various elements of computing system 110, PSU 120 can provide power to charge battery 111. In general, PSU 120 can convert electrical power from a source (e.g., an electrical outlet) into an appropriate power format needed computing system 110. This can include power conversion from AC to DC, or among various voltage levels at associated currents. A user might connect PSU 120 to a power source for certain periods of time, during which battery 111 might be able to be charged, and then disconnect PSU 120 from the power source during which battery 111 provides power to operate computing system 110. Various switchover or power source selection circuitry is provided in computing system 110 to operate using source power or battery power.

Computing system 110 includes control software capable of dynamically managing the charge rate of battery 111 based at least on preferences of user 101. Specifically, computing system 110 provides charge preference element 151 that permits user 101 to select a charge rate preference from a set of charge rate preferences. In the example of charge preference element 151, user 101 selects from discrete or gradual charging preferences, with some discrete levels labeled for clarity. These discrete levels include charging preferred, balanced, and performance preferred. In the example of "charging preferred," the control software of computing system 110 can prioritize the charging of battery 111 over providing power to compute resources or other on-board systems, such as the main system processor of computing system 110. In the example of "performance preferred," the control software of computing system 110 can prioritize performance of computing system 110 over allocating power and charge rate to battery 111. Lastly, "balanced" attempts to prioritize neither processing performance nor charging rate on computing system 110 but permits computing system 110 to dynamically adjust power delivery and charge rate based at least on the current workloads of the main system processor of computing system 110 or based at least on a present level of charge of battery 111, among other factors. For example, when the workload of the main system processor (or other elements) is below a threshold level, then the control software can prioritize charging rate of battery 111. However, when the workload of the main system processor increases, then the power budgeted to the main system processor can take preference over charging of battery 111. Other examples of "balanced" operation might include providing equal amounts of power to charging of battery 111 and the main system processor, among other mixes and balances.

Although demonstrated with three user-selectable options in the example of computing environment 100, computing system 110 can employ any number of charge rate preferences for a user that range from performance bias to battery charging bias. Further, while demonstrated as a slider in the example of computing environment 100, in some examples, user 101 interacts with computing system 110 to provide a preference using a drop-down menu, speech/natural language processing, accessibility user interface, terminal interface, script or scripting language, application programming interface (API), web portal, or other input mechanisms. For example, user 101 might provide a voice input indicating a request to "charge battery 111 as quickly as possible." In response to the request, the control system of computing system 110 (or a natural language processing service available over a network by computing system 110) can process the speech of user 101 and change the charge preference associated with battery 111.

In at least one implementation, the control system of computing system 110 monitors charging and time related behaviors from user habits with regard to computing system 110. The charge time information can include times/days that computing system 110 is receiving power from PSU 120, lengths of times that computing system 110 is receiving power from PSU 120, the state of charge when computing system 110 is receiving power from to PSU 120, or other factors. The control system of computing system 110 determines a predicted forecast for charging computing system 110 based at least on the factors and alters a charging preference or charging rate based at least on the predicted forecast. For example, when the predicted forecast indicates that the user likely connected computing system 110 to PSU 120 for a brief period and the charge of battery 111 is below a threshold charge level on computing system 110, then the control system of computing system 110 will automatically adjust the charge preference to a charging preferred setting that prioritizes charging the battery over providing resources to the main system processor and/or adjusts temperature thresholds upward for computing system 110.

These automated charge rate changes can be made automatically without direct input provided by the user and can be based at least on a predicted charging schedule or usage forecast for computing system 110. Various machine learning or artificial intelligence systems, such as large language models (LLMs), generative pre-trained transformers (GPTs), co-pilot user interface systems, or other neural network varieties can process and interpret user input to determine settings for the user-selectable options, and make adjustments according to predicted or forecasted behavior and usage patterns. This can include interpreting intent of the user to apply among various discrete levels or gradations of battery-vs-performance settings of computing system 110. Also, interpretations of user input can include determining charging durations, operational predictions, and performance needs of users and computing system 110 based at least on past usage patterns or usage patterns commonly determined among many users. In one specific example, past usage patterns can be analyzed to determine that a uses is likely to disconnect from a power source within approximately an hour (such as by anticipating an end time of office work hours, or mobility patterns associated with the user), and the control system can increase the battery charge rate to maximize battery charge available to the user after computing system 110 is potentially disconnected from a power source (e.g., PSU 120). Automated or predictive charge rate change techniques include technical benefits and technical effects, such as anticipating timeframes when charging modes can produce a greater level of charge in a battery to allow a user to function on battery power for a longer period of time after removal or unplugging of system power to a device.

Returning to example charge rate selection operations of computing system 110, once user 101 selects an option from slider 161, computing system 110 can responsively identify a first charge rate for battery 111 of computing system 110. The first charge rate is determined based at least on the preference selected by user 101, the power available for delivery from PSU 120, the maximum charge rate for battery 111, the current charge level status of battery 111, the current temperature indicated by various temperature sensors, or other factors. Once the first charge rate is identified, which may include an indication in Amps (A), Watts (W), fraction/ percentage of total available power, or other metrics, then control software of computing system 110 applies the first charge rate to charging of battery 111 and allocates a remainder power from PSU 120 to other operations of computing system 110, such as to a main system processor and corresponding elements.

One of the various factors which can limit the charge rate for a battery of computing system 110 includes external skin temperatures of an enclosure or chassis which houses battery 111 and other components. As a battery is charged, heat is generated which must be removed or reduced, such as by translating the heat to an exterior surface of computing system 110 for further transfer to the environment. This heat transfer can be accelerated by chassis fans, heat sinks, heat pumps, heat pipes, or other thermal transfer mechanisms. However, this skin temperature relates to how hot the exterior surface of computing system 110 might feel to a user, with higher temperatures corresponding to less comfort or other undesirable effects. To keep this skin temperature under a threshold temperature, a battery is typically held to a charge rate below a maximum charge rate reachable for a present battery level of charge. In the enhanced examples herein, the user selections for battery charge preferences or performance balance can trigger adjustment of these temperature thresholds for skin temperature or other temperatures. For example, when a user selects "charging preferred" operation, then adjustments to skin temperature thresholds can be made which increase the threshold level, allowing a faster charge rate of battery 111 at the expense of more power output of PSU 120 allocated to charging battery 111 which generates associated heat from this faster charge rate. As will be discussed in FIG. 6, these adjustments can include incremental increases to skin temperature thresholds to prevent or reduce throttling of power provided to battery 111. Conversely, when a user selects the "performance preferred" operation, then adjustments to skin temperature thresholds can be made which reset the threshold level to default (unadjusted) values or decrease the values. This can provide for a slower rate of charge to battery 111 which generates less associated heat. Various secondary temperature mitigation steps can be taken, such as adjusting chassis fan speed, reducing a charge rate of battery 111, reducing clock speeds of computing system 110, or reducing a performance of the main system processor.

In some implementations, when computing system 110 is operating according to the "charging preferred" preference, the control software of computing system 110 uses a first temperature mitigation operation that does not reduce the preferred charge rate of battery 111. For example, the control software of computing system 110 can increase fan speed, reduce power to the main system processor (to reduce heat dissipation), change the clock speed of the main system processor (to reduce heat dissipation), or adjust some other operation. If the temperature continues to exceed a temperature threshold, the control software of computing system 110 can elect to decrease the charge rate of battery 111 to correspondingly reduce the temperature below the temperature threshold.

An additional factor to be considered is that a remainder of the power supplied by PSU 120, which is not provided to battery 111, is typically provided to other components of computing system, such as the main system processor. Many main system processors, such as central processing units (CPUs) or systems-on-a-chip (SoCs) have a minimum thermal design power (TDP) or minimum processor power state to ensure appropriate functional and error-free operations. Thus, remainder power provided to the main system processor (and other components) must still meet this minimum TDP, and can place upper limits on how high of a charge rate or how large of a power allocation battery 111 can receive, even when temperature thresholds are not exceeded.

Figure 2:
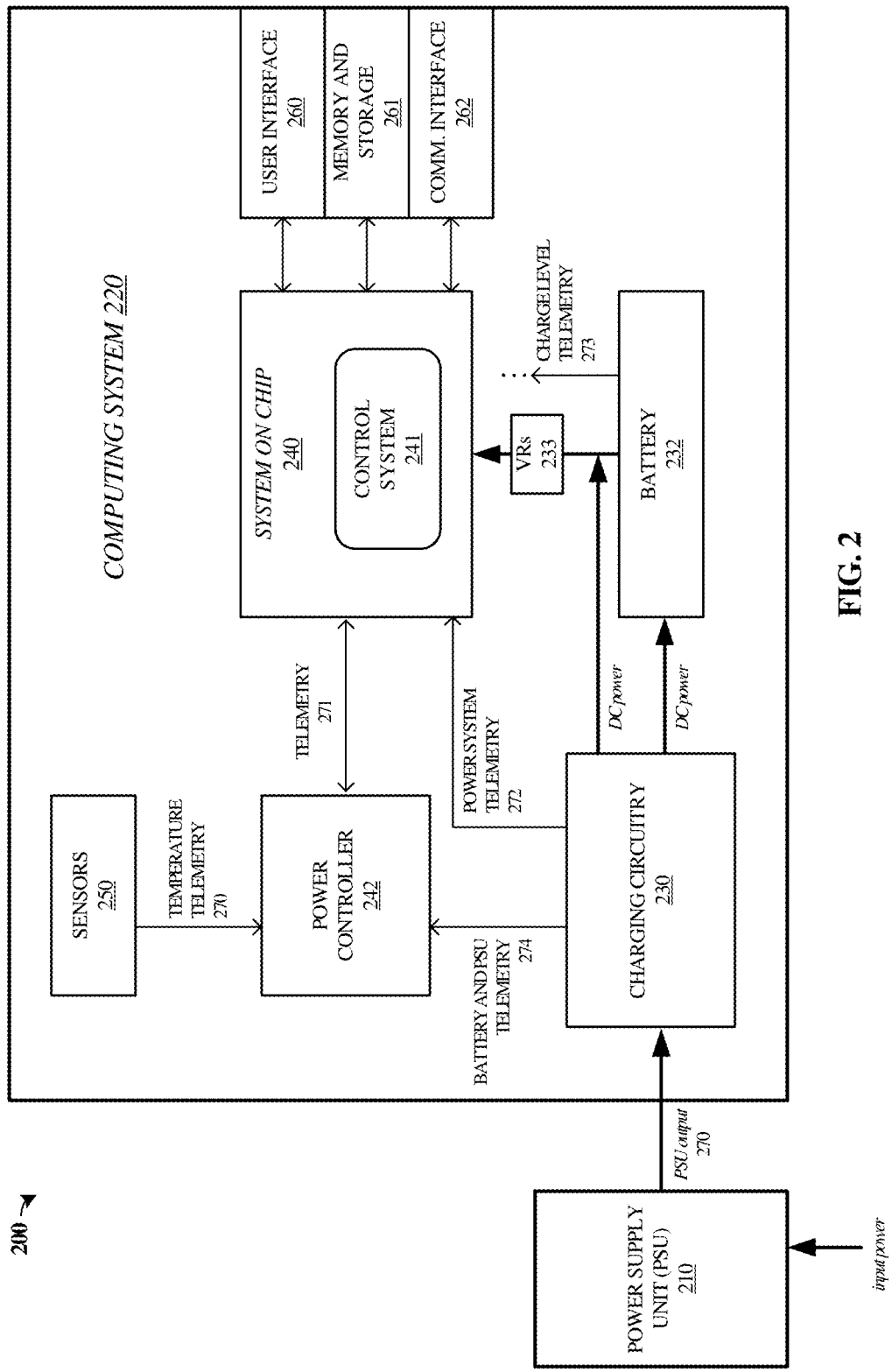
FIG. 2 illustrates a computing environment to provide dynamic charge rate control for a computing system in an implementation.

FIG. 2 illustrates another example computing environment 200 for which enhanced battery charge rate selections and adjustments can be implemented. Computing environment 200 can provide dynamic charge rate control for a computing system in an implementation. Computing environment 200 can be an example implementation of computing environment 100, although variations are possible.

Computing environment 200 includes power supply unit (PSU) 210 coupled over link 270 to computing system 220. Computing system 220 includes charging circuitry 230, power controller 242, sensors 250, system-on-chip (SoC) 240, battery 232, voltage regulators (VRs) 233, user interface 260, memory and storage 261, and communication interface 262. Computing environment 200 further includes various signaling or messaging for conveying telemetry among the various elements, such as temperature telemetry 275, battery, charger, and sensor telemetry 271, power system telemetry 272, charge level telemetry 273, and battery and PSU telemetry 274. SoC 240 provides at least control system 241, with example operations described below with respect to FIG. 3. Although demonstrated as implemented within SoC 240, control system 241 can be implemented on another element of computing system 220, such as power controller 242, a dedicated processor, or other processing element, including combinations thereof.

In computing environment 200, PSU 220 is connected to computing system 220 to supply power to computing system 220. Charging circuitry 230 on computing system 220 receives the power provided by PSU 220 and allocates portions of the power to battery 232 and SoC 240 based at least on charge preferences supplied by the user of computing system 220. Here, power controller 242 receives and manages information from different systems and elements within computing system 220, including sensors 250 that provide temperatures for the skin or chassis of computing system 220 and battery 232. Charging circuitry 230 provides battery and PSU information 274, which includes the maximum power available from PSU 210, the maximum charge rate for battery 232, or other information associated with PSU 210 and battery 232. Power controller 242 further communicates with SoC 240 to provide battery, charger, and sensor information 271 that is processed by charge rate operation 300 to determine a desired charge rate from PSU 210 to battery 232. Battery 232 further provides charge level telemetry or status information 273 that can be provided directly to SoC 240 or can be provided to power controller 242 prior to being supplied to SoC 240. Charging circuitry 230 further supplies power system monitoring 272 that provides status information associated with the supplied power to battery 232 and SoC 240.

Other elements in computing system 220 include user interface 260. User interface 260 may include a keyboard, microphone, display screen, mouse, touch pad, touch screen, voice input, accessibility interface, natural language interface, API, or other user input/output apparatus. User interface 260 provides input/output information to SoC 240 including receiving selections associated with charge preferences for computing system 220 through provided user interface elements.

Computing system 220 further includes memory and storage 261 that is coupled to SoC 240. Memory and storage 261 may include volatile and nonvolatile, removable, and non-removable media implemented in any method or technology for storage of information, such as computer readable instructions, data structures, program modules, or other data. Memory and storage 261 may be implemented as a single storage device but may also be implemented across multiple storage devices or sub-systems. Memory and storage 261 may comprise additional elements, such as a controller to read operating software from the storage systems. Examples of storage media include random access memory (RAM), read only memory (ROM), magnetic storage devices, optical storage devices, solid state storage devices, or flash memory, as well as any combination or variation thereof, or any other type of storage media. In some implementations, the storage media may be a non-transitory storage media, but in no case does the storage media comprise propagated signal. Memory and storage 261 stores at least program instructions to support control system 241 executed by SoC 240. Other software stored in memory and storage 261 includes an operating system, utilities, drivers, network interfaces, applications, or other type of software. SoC 240 can comprise microprocessors, central processing units (CPUs), graphics processing units (GPUs), programmable logic units, application specific integrated circuits, or other circuitry capable of supporting the operations described herein. Power controller 242 can comprise similar elements as SoC 240, or can include a microcontroller, among other elements.

Computing system 220 also includes communication interface 262 coupled to SoC 240. Communication interface 262 comprises components that communicate over communication links, such as wired, optical, or wireless network interfaces, network ports, radio frequency (RF) links, processing circuitry and software, or some other communication devices. Communication interface 262 may be configured to use Internet Protocol (IP), Ethernet, optical networking, wireless protocols, communication signaling, or some other communication format, including combinations thereof. Communication interface 262 can communicate with other computing systems, routers, switches, and the like.

In computing environment 200, user interface 260 receives a user selection of a charge preference for battery 232. Based at least on the user selection, SoC 240 and computing system 220 biases allocation of a power supplied to computing system 220 by PSU 210 to charging of battery 232 while providing a remainder of the power to at least SoC 240. Specifically, when the user selection indicates a charging preference, computing system 220 biases the power supplied from PSU 210 to charging battery 232 over supplying power to SoC 240. In biasing the power, computing system 220 identifies the desired rate of charge for battery 232 and provides a remaining power to SoC 240. The maximum rate of charge of battery 232 is based at least on various factors, including the current charge level of the battery (e.g., percent charged from empty or from full), temperature of the battery, PSU supply power limits, or other factors.

After biasing the power allocation, SoC 240 further receives temperatures 275 as part of information 271 from power controller 242 and determines when a temperature exceeds adjustable temperature thresholds associated with the user preference. Once exceeded, computing system 220 performs a temperature mitigation operation. The temperature mitigation operation includes increasing fan speed, limiting clock speed of SoC 240, limiting performance of SoC 240, or performing some other operation. In some implementations, the temperature mitigation operation alters the allocations of the power supply capacity responsive to the temperature exceeding the threshold. As an example, when the skin temperature exceeds a threshold, computing system 220 can decreases the power available to SoC 240 to reduce the temperature of the computing system without affecting the charge rate of battery 232. Computing system 220 can also reduce the charging rate for battery 232 when the other mitigation operations are incapable of bringing the desired temperatures of computing system 220 below a threshold level or adjusted threshold level.

Figure 3:
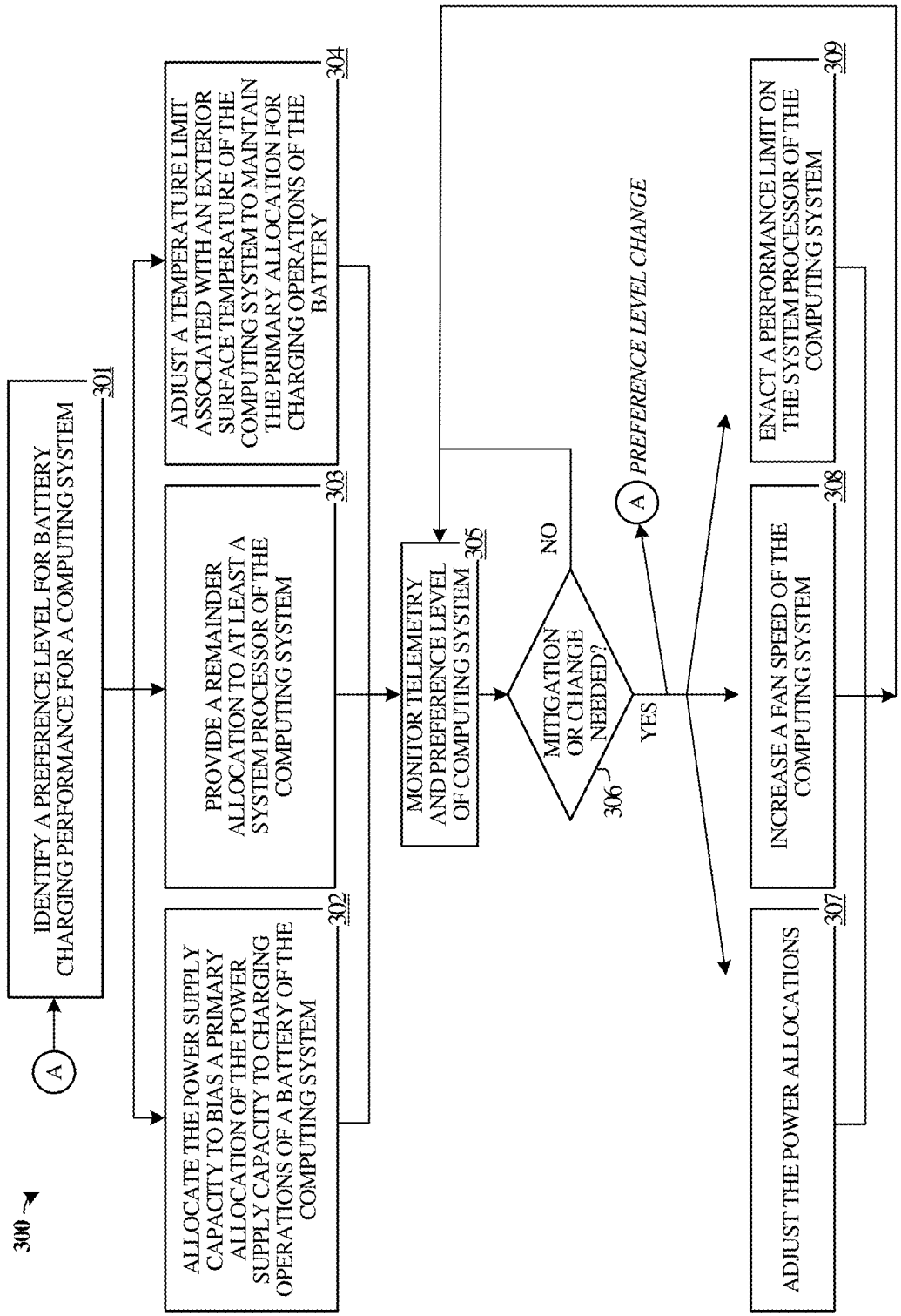
FIG. 3 illustrates operations of a computing system to provide dynamic charge rate control in an implementation.

FIG. 3 illustrates operations 300 of a computing system to provide dynamic charge rate control in an implementation. While the operations of FIG. 3 are referenced below with respect to elements of FIG. 2, it should be understood that these operations can apply to elements of FIG. 1 or other elements described herein.

In operation 301, control system 241 identifies a preference level for battery charging performance for computing system 220. This preference level might include selections among battery charging preferred, balanced, or system processor performance preferred, among other selections. The selections might be made by a user via a user interface or by an automated system using predictive or usage pattern-based selections.

Based at least on the selection of a battery charging preferred mode of operation, control system 241, in operations 302-303, allocates the power supply capacity to bias a primary allocation of the power supply capacity to charging operations of a battery of the computing system, and provides a remainder allocation to at least a system processor of the computing system. To make the allocations, control system 241 communicates with power controller 242 to indicate the allocations, and power controller 242 can implement power limits for various activities and power distribution functions of charging circuitry 230. The allocations can be made in terms of absolute or relative power allocations, or may be proportional, percentage-based, or relative scaling factors made among the primary and remainder allocations, with a greater allocation dedicated to charging operations for battery 232 when in the battery charging preferred mode of operation. It should be understood that, at any given time, the battery charging operations or the system processor might not actually consume all of the allocated portion of the system power capacity. The allocations and allocation types listed above include technical benefits and technical effects, such as having proportional or relative allocations, which can scale according to any compatible power supply unit plugged into a device, and compensate automatically for different brands, types, or power capacities of power supply units.

Additionally, control system 241 can adjust temperature limits for computing system 220 to allow battery 232 to continue to charge at a selected charge rate for a longer period of time. In operation 304, control system 241 adjusts a temperature limit associated with an exterior surface (i.e., skin temperature) of the computing system to maintain the primary allocation for charging operations of the battery at a selected allocation. These temperature limit adjustments are discussed in detail in FIG. 4, and can include incremental adjustments to default skin temperature limits for computing system 220. Likewise, other temperature limit adjustments can be made for computing system 220, similar to those of the skin temperature limits, such as battery internal temperature limits, SoC 240 temperature limits, or internal case temperature limits.

During charging operations, control system 241 monitors telemetry and preference levels of computing system 220 in operation 305. This telemetry monitoring can include gathering or receiving telemetry from among the various elements in computing system 220, such as from sensors 250, power controller 242, charging circuitry 230, battery 273, and PSU 210. Monitored temperatures can include skin temperature, battery cell/internal temperature, SoC 240 temperature, internal chassis temperature, ambient temperature, among others. Other telemetry can include rates of charge of battery 232, a charge level of battery 232, a charge mode of operation for battery 232, power supply maximum output or capacity for PSU 210, and other various telemetry. Yet further telemetry includes display/screen on/off indications for computing system 220, and indications of a present suspend, sleep, or hibernate mode for computing system 220.

When certain temperature thresholds or limits are reached, which can vary based at least on the charging mode of operation and the preference level for battery charging performance for computing system 220, various mitigations can be triggered in operation 306. Likewise, when various operational telemetry indicates a status change for computing system 220, then various actions can be taken. The mitigations or actions include making changes to battery charging rates or modes, altering power allocations among battery charging operations and system processor remainders (operation 307), increasing fan speeds for on-board chassis fans of computing system 220 (operation 308), or enacting one or more performance limits on the system processor of computing system 220 (operation 309).

Control system 241 can adjust the power allocations by adjusting relative ratios or proportional amounts provided to each among the battery charging operations and system processor operations. The power allocations might maintain a ratio but have a power cap implemented to limit the maximum power available for allocation, which can vary based at least on PSU capacity or status, temperatures of computing system 220 reaching levels warranting an overall decrease in power consumption, or other factors. Control system 241 can adjust the power allocations based at least on changes to a preference among battery charging performance or system processor performance, such as to reduce or remove a bias for battery charging operations. Control system 241 can adjust the power allocations based at least on a present state of battery 232, such as based at least on a present charge level, a present battery cell temperature, or according to battery maintenance or end-of-life considerations.

Control system 241 can increase a fan speed or cooling rate of other thermal regulation components of the computing system when certain temperature thresholds are reached. This increase in fan speed or cooling can provide for maintaining selected allocations for a longer period of time while keeping a skin temperature at or below a limit.

Control system 241 can enact a performance limit on the system processor of the computing system, such as a performance limit on SoC 240. This performance limit can further aid in reduction of a temperature or maintenance of a temperature below a limit for computer system 220 to allow battery 232 to remain charging at a selected rate. The performance limits can take various forms, as discussed herein, such as power dissipation limits, clock frequency limits or reductions, operational/execution limits, workload limits, processor core voltage reduction techniques, or other performance limits.

FIG. 4 illustrates a data structure 400 which can be employed to manage battery charge rates and temperature thresholds for a computing system in an implementation. Data structure 400 includes rows for various battery charge modes including normal charge 410, slow charge 411, and trickle charge 412. Data structure 400 also includes rows for temperature mitigation modes of operation including power cap 413, fan speed 414, and SoC throttle. Data structure 400 further comprises different columns for different battery charging preference selections or preference selections modified by operational factors. The first column 460 provides temperature limit settings for a variety of conditions, namely for a "charging preferred" preference selection (that biases system power to charging of a battery over system processor performance), for a "balanced" preference selection when a battery charge level is less than X (e.g., a selected percentage charged lower limit), when a display screen is off (for a laptop computer, for example), or when the computing system is in a standby/suspend/hibernate mode. The second column 461 provides temperature limit settings for the "balanced" preference selection when a battery charge level is between X and Y (e.g., a selected percentage charged range). The third column 462 provides for temperature limit settings for the "balanced" preference selection when a battery charge level is over Y (e.g., a selected percentage charged upper limit), or for a "performance preferred" preference selection is enabled (that biases system processor performance of the computing system over the charge rate of the battery). The various battery charge modes listed above include technical benefits and technical effects, such as scaling a charge rate of a battery in accord with a level of charge a battery presently has, or according to preferences to provide a larger rate of charge or larger level of charge to a battery over a given period of time, as well as providing adjustable temperature limits for user touch safety during selected charge modes to maintain a selected charge rate for a longer period of time.

Data structure 400 further includes temperatures 420-428 indicating temperature limit settings and formula 440. Temperatures 420-428 each include a skin temperature limit ("skintemp") that is representative of a default chassis/enclosure exterior temperature limit for the computing system and an offset or incremental adjustment that is representative of an offset (+/−) from the default skin temperature limit.

As indicated, temperature 420 comprises a default skin temperature limit, in degrees Celsius (° C.), with an offset of A° C., temperature 421 comprises the default skin temperature limit with an offset of B° C., temperature 422 comprises the default skin temperature limit with an offset of C° C., temperature 423 comprises the default skin temperature limit with an offset of D° C., temperature 424 comprises the default skin temperature limit with an offset of E° C., temperature 425 comprises the default skin temperature limit with an offset of F° C., temperature 426 comprises the default skin temperature limit with an offset of G° C., temperature 427 comprises the default skin temperature limit with an offset of H° C., and temperature 428 comprises the default skin temperature limit with an offset of I° C. Example values for the default skin temperature limit and for offsets A-I can vary over different implementations. In some examples, the default skin temperature is 45° C. Example values for offset A=+1° C., B=+2° C., C=+3° C., D=−2° C., E=+1° C., F=+3° C., G=−3° C., H=−2° C., and I=+3° C. Thus, temperature 420 might correspond to 45° C.+1° C.=46° C., temperature 423 might correspond to 45° C.−2° C.=43° C., and so on for the other temperatures in data structure 400.

Normal charge 410, slow charge 411, and trickle charge 412 relate to charge rate modes that can be each enabled or triggered based at least on temperatures 420-428 for the particular charging preference selection and battery RSOC indicated in each column. The exact charging rates can vary over different implementations, but in some examples, normal charge rate mode 410 relates to 50% (or 0.5 scaling factor) of the maximum output of the power supply capacity, slow charge rate mode 411 relates to 20% (or 0.2 scaling factor) of the maximum output of the power supply capacity, and trickle charge rate mode 412 relates to 10% (or 0.1 scaling factor) of the maximum output of the power supply capacity. Thus, the actual charge rates (i.e., in Watts) will scale or vary according to the maximum output of the power supply capacity for the actual power supply unit coupled to the computing system.

As an example, when a battery charge preference selection is identified for the computing system, whether by user input or by predictive/usage based modifications, column 460 would apply, and the computing system uses temperatures 420-422 to determine when changes are made to the charge mode settings of the battery. Accordingly, when the skin temperature reaches temperature 421, the computing system initiates slow charge 411 that is lower than the normal (present maximum) charging rate. The lowering of the charge rate is used to mitigate skin temperature increases associated with charging of the battery.

Advantageously, the skin temperature incremental adjustments permit higher operating or battery charging temperatures than the default skin temperature limits. Specifically, by increasing the temperature limits that trigger changes to the battery charging rates, the computing system can maintain a higher or faster charging rate for the battery for a longer period of time, providing the battery with more charge in a given time. This has the technical benefit and technical effect of providing a greater amount of charge into a battery over a particular amount of time.

Although charge rate modes demonstrated in data structure 400 include normal charge 410, slow charge 411, and trickle charge 412, all of which relate to fractional portions of the maximum output of the power supply capacity, some computing systems might be capable of rapid charge modes (not pictured) that are employed until a corresponding temperature threshold is reached. The rapid charge modes can involve even higher charging currents or voltages, allowing for quicker charging times compared to conventional charging levels. Using the charging preferred example in column 460, the computing system will use the rapid charge rate until temperature 420 is reached for the skin of the computing system. Once temperature 420 is reached, the computing system will move to normal charge 410. Normal charge 410 represents a smaller fraction of the power supply capacity than the rapid charge mode in an attempt to reduce the skin temperature associated with the computing system.

In addition to the different charge modes (410-412) associated with the battery based at least on temperature limits, data structure 400 further includes temperature mitigation operations including power cap 413, fan speed 414, and processor throttle 415 that are affected or enforced when the device is in the charge preference of column 460.

Power cap 413 comprises a power limit which can be applied to allocation of a power supply capacity among the charging of the battery and remainder allocations to a system processor and other components of the computing system. Power cap 413 can be determined by formula 440, but may instead have other techniques to determine a power cap. Formula 440 comprises a relation indicating a system average power limit (or 'cap') based at least on a power supply capacity (can vary based at least on the particular PSU employed), a current requested by the battery charging circuitry (can vary based at least on battery charge level, battery temperature, battery capacity, and other factors), and a minimum power required by the system processor (in terms of a scaling factor applied to a TDP, such as 0.7*TDP), as well as other factors.

Fan speed 414 can be employed used to enable/disable, ramp up/down, increase/decrease, or otherwise adjust the speed of enclosure fans of the computing system in conjunction to assist in maintaining temperatures of the computing system (such as skin temperatures or battery internal temperatures). Adjustments to fan speed 414 can prolong higher rates of charge for a battery by transferring more heat out of the enclosure or away from a chassis/skin of the computing system. Fans can be ramped up, in terms of sound levels, to a particular fan noise level over a temperature range to eventually reach a maximum fan speed or fan noise level. One example implementation includes ramping fans to 30 dBA over temperatures reaching 34° C.

Processor throttle 415 can be used to mitigate against temperature rise of the computing system from charging of the battery by permitting various forms of throttling associated with the system processor or other throttleable elements of the computing system. A throttle can be determined in terms of power allocated to the system processor or in terms of clock frequencies for the system processor, among other throttling techniques (i.e., workload throttling). The throttling of the system processor (e.g., SoC or CPU) of the computing system typically has a maximum throttle amount to still allow error free performance or minimum performance of the system processor. For example, the throttle of the system processor can be limited to 70 percent TDP of the system processor to maintain minimum viable operations of the computing system. Processor throttle 415 can be employed or triggered when the computing system is in a charging preference associated with column 460. The throttling is used to prioritize the charging of the computing system battery, while reducing the clock frequency or limiting TDP of the system processor when a monitored temperature exceeds a threshold. As an example, when the internal temperature of the battery exceeds a threshold, the computing system can reduce the clock frequency provided to the system processor. The clock frequency can be reduced until the TDP reaches a minimum TDP for the system processor. Once the minimum is reached, the computing system performs other mitigation operations in association with reducing temperatures of the computing system to maintain a selected battery charge rate. The mitigation operations can reduce the skin temperature of the chassis of the computing system, reduce the internal temperature of the battery, or provide some other temperature reducing operation.

In some implementations, a computing system uses status information or activity information for the computing system to determine whether to automatically initiate the charging preferred selection. The activity information includes whether the device is in a sleep state, whether the screen is on or off, or some other activity information. Thus, even if not directly requested from the user, when no or little activity is being performed on the computing system, the computing system moves to the charging preferred state to improve the charge rate of the battery. If the computing system changes its activity state (e.g., the computer is moved out of sleep state), then the computing system is returned to the user selected state. Thus, when the computing system is inactive, the computing system prefers charging, but defers to the user selection when the computing system is active.

These examples can be employed in combination with predictive or usage pattern-based changes to charge preferences noted herein.

Figure 5:
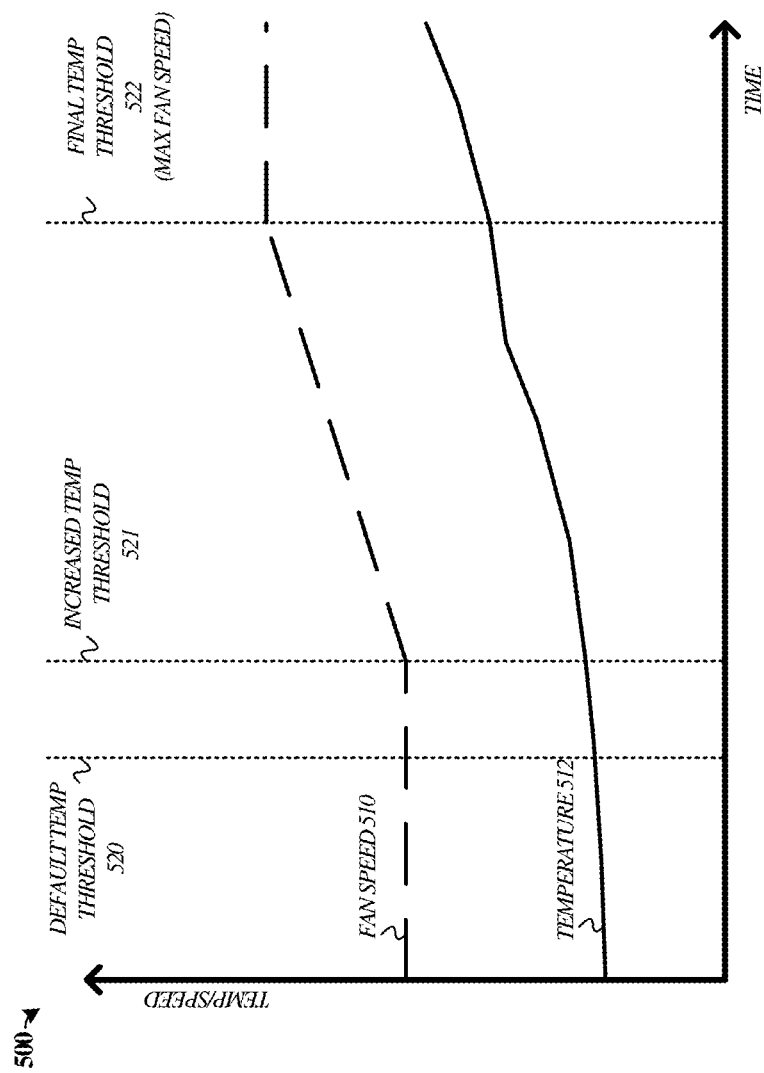
FIG. 5 illustrates an operational scenario of changing the fan speed of a computing system to support a desired charge rate in an implementation.

FIG. 5 illustrates an operational scenario 500 of changing the fan speed of a computing system to support a desired charge rate in an implementation. Operational scenario 500 can be used in conjunction with one or more other operations, or can be implemented individually. Operational scenario 500 includes a graph with a vertical temperature/speed axis and horizontal time axis. Operational scenario 500 further demonstrates fan speed 510 and temperature 512 with various events including default temperature threshold 520, increased temperature threshold 521, and final temperature threshold 522. The temperatures can relate to various temperatures monitored for a computing system, but in this example relate to an exterior case temperature or 'skin' temperature for the computing system.

As described herein, when a power supply is coupled to a computing system, control software on the computing system determines an allocation of power capacity to charge the battery and to provide to other processing systems on the computing system. The allocation is based at least on a variety of factors, including a power preference selected by the user from a set of available preferences, maximum power rating for the power supply, charge level associated with the battery, potential charge rate available for the battery, or some other factor. Once the power capacity is allocated to the battery and the other processing systems, the computing system monitors one or more temperatures associated with the computing system. Based at least on an indication of a battery charge bias preference, an increased temperature threshold can be determined, such as shown for increased temperature threshold 521.

In at least one example, the computing system monitors a temperature 512 associated with the battery of the computing system. When temperature 512 reaches default temperature threshold 520, the computing system does not yet initiate an increase in fan speed 510. However, when temperature 512 reaches increased temperature threshold 521, the computing system initiates an increase in the fan speed. The increase in fan speed only after increased temperature threshold 521 is used to remove heat from the battery under charge and is applicable when the user of the computing system indicates a charging preferred preference for the computing system. For example, when the user selects the charging preferred preference, the computing system will compromise fan noise to charge the battery at a faster rate and attempt to maintain a temperature associated with the skin or exterior of the computing system below increased temperature threshold 521. However, when the user selects another charging option, such as a preference for compute performance, the fans will not be modulated based at least on the same temperature thresholds. Rather, the fans may be modulated based at least on default temperature threshold 520 or even reduced temperature thresholds lower than threshold 520.

Returning to the example of operational scenario 500, after fan speed 510 is increased at temperature threshold 521, the computing system continues to monitor the skin temperature and increases the fan speed as the temperature increases or heat load increases. The fan speed is increased until temperature threshold 522 where fan speed 510 reaches a limit. After temperature threshold 521, fan speed 510 is maintained at the highest speed, while the computing system monitors the temperatures to determine other mitigation operations for the temperatures in the computing system. The other mitigation operations include lowering the clock speed associated with a system processor, lowering the power available to the system processor, lowering the power allocated for charging the battery, or performing some other mitigation operation.

Figure 6:
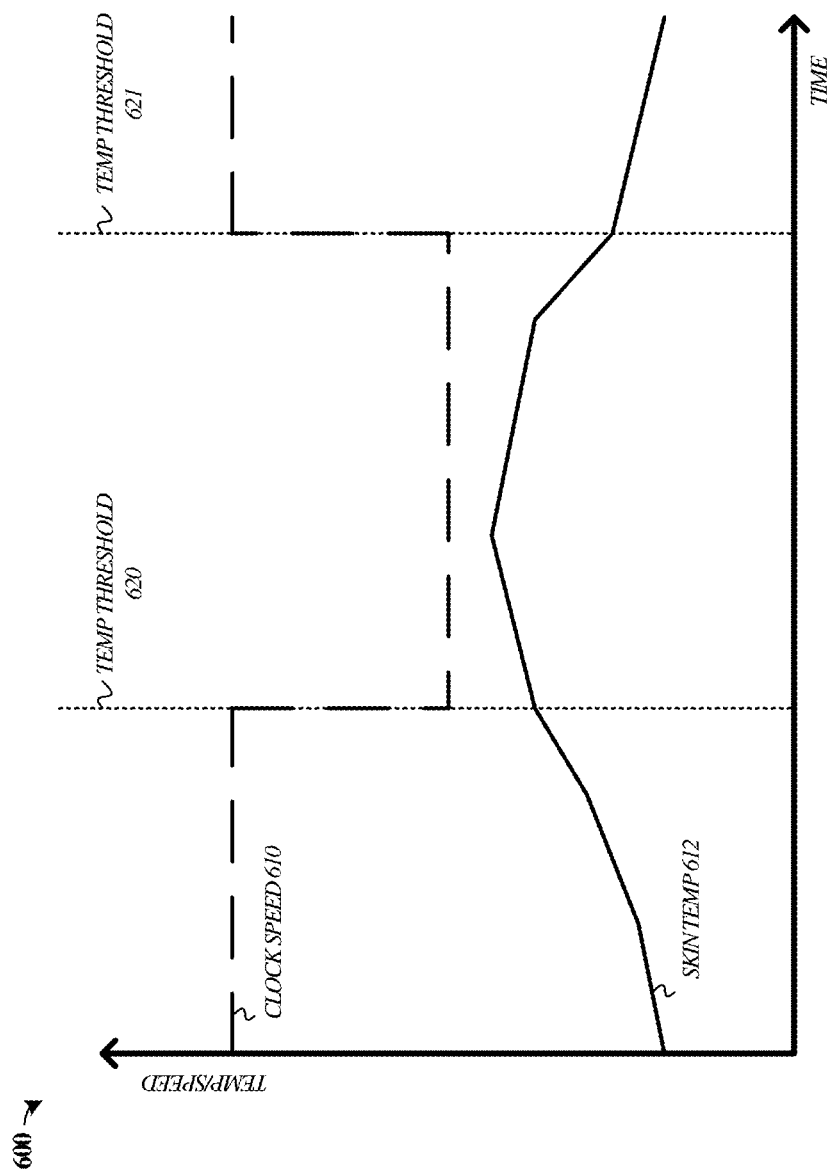
FIG. 6 illustrates an operational scenario of changing the processor speed of a computing system to support a desired charge rate in an implementation.

FIG. 6 illustrates an operational scenario 600 of changing the processor speed of a computing system to support a desired charge rate in an implementation. Operational scenario 600 can be used in conjunction with one or more other operations, or can be implemented individually. Operational scenario 600 includes a graph that includes curves for skin temperature 612 and clock speed 610. Operational scenario 600 includes a vertical axis for temperature/speed and a horizontal axis for time. Operational scenario 600 further includes temperature thresholds 620-621.

In operational scenario 600, a computing system monitors skin temperature 612 as a function of time and determines when the chassis temperature exceeds a temperature threshold 620. Once the chassis temperature exceeds temperature threshold 620, the computing system reduces clock speed 610 associated with a CPU of the computing system. In some implementations, the computing system maintains one or more data structures or algorithms that implement temperature management based at least on charging preferences by the end user of the computing system. In some examples, a first preference includes a charging preferred preference that promotes the charging of the battery over the compute performance of the computing system. The charging preference will favor higher temperature thresholds associated with charging the battery that support faster charging rates, or will provide some other operation that promotes the charging of the battery. In contrast, other charging preferences for the user include a balanced status that is used to balance the charging of the battery with the compute performance of the computing system and a compute preferred preference that favors providing power resources to the processor of the computing system over charging the battery of the computing system.

Here, the graph of operational scenario 600 represents a computing system in a charging preferred state. As skin temperature 612 increases, the computing system reduces the clock speed to support the charging preferred selection of the end user. Advantageously, while less power is used by the processing system of the computing system, the temperatures are reduced, permitting additional charging power for the battery. As time progresses and the temperature is reduced, exit temperature threshold 621 is satisfied and the computing system can increase clock speed 610. The increasing of clock speed 610 in relation to skin temperature 612 permits the computing system to dynamically adjust resources to the processing system while ensuring the computing system is in the best condition to support battery charging. Although demonstrated as using the skin temperature, the computing system uses other temperature sensors in some examples, such as a battery temperature sensor.

Figure 7:
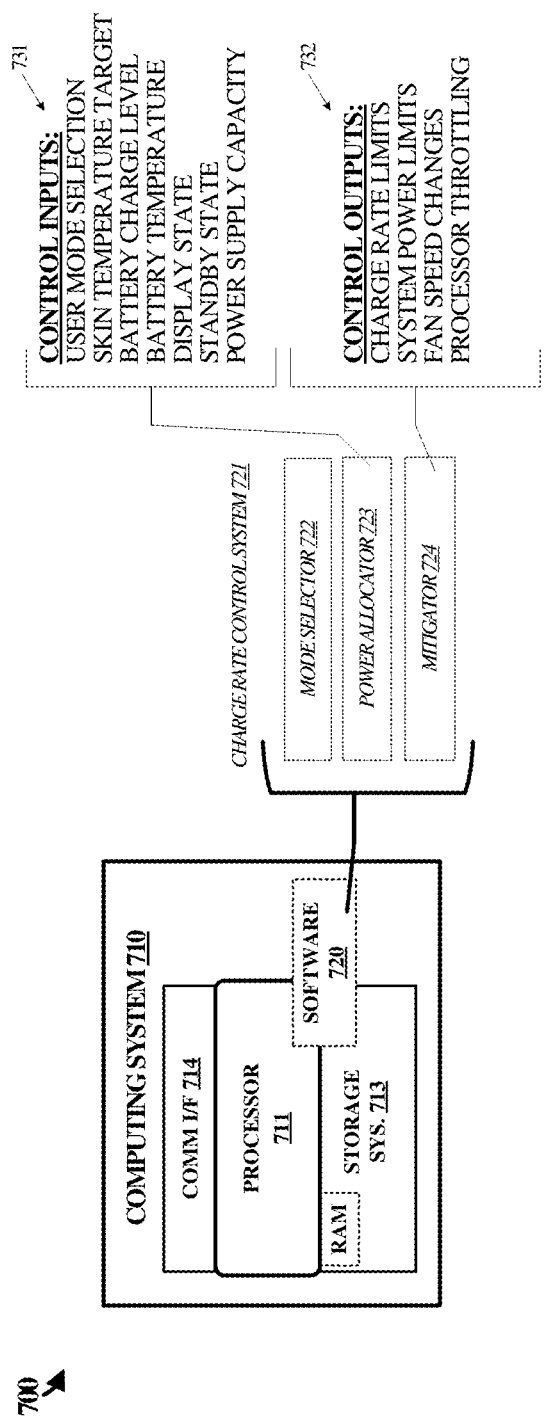
FIG. 7 illustrates an example computing system suitable for implementing any of the architectures, platforms, processes, methods, and operational scenarios disclosed herein.

FIG. 7 illustrates an example computing system 700 suitable for implementing any of the architectures, platforms, processes, methods, and operational scenarios disclosed herein. For example, computing system 710 can be used to implement elements of computing system 110 of FIG. 1 or elements of computing system 220 of FIG. 2.

Examples of computing system 710 include, but are not limited to, laptop computing devices, tablet computing devices, smartphone devices, portable computing devices, or any other electronic device with chargeable batteries, as well as any other type of physical or virtual machine, and other computing systems and devices, as well as any variation or combination thereof. Computing system 710 may be implemented as a single apparatus, system, or device or may be implemented in a distributed manner as multiple apparatuses, systems, or devices. Computing system 710 includes, but is not limited to, processor 711, storage system 713, communication interface system 714, and software 720. Processor 711 is operatively coupled with storage system 713 and communication interface system 714.

Processor 711 loads and executes software 720 from storage system 713. Software 720 includes charge rate control system 721, which is representative of various enhanced operations and processes discussed with respect to the preceding Figures. When executed by processor 711 to enhance battery charging control in a computing system, software 720 directs processor 711 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processor 711 may comprise processing circuitry that retrieves and executes software 720 from storage system 713. Processor 711 may be implemented within a single processing device, but may also be distributed across multiple processing devices, sub-systems, or specialized circuitry, that cooperate in executing program instructions and in performing the operations discussed herein. Examples of processor 711 include general purpose central processing units, system-on-a-chip devices, application specific processors, and logic devices, as well as any other type of processing device, combinations, or variations thereof.

Storage system 713 may comprise any computer readable storage media readable by processor 711 and capable of storing software 720. Storage system 713 may include volatile and nonvolatile, removable and non-removable media implemented in any method or technology for storage of information, such as computer readable instructions, data structures, program modules, or other data. Examples of storage media include random access memory (RAM), read only memory (ROM), semiconductor storage media, magnetic storage media, optical storage media, flash storage media, virtual memory and non-virtual memory, or any other suitable storage media. In no case is the computer readable storage media a propagated signal. In addition to computer readable storage media, in some implementations storage system 713 may also include computer readable communication media over which at least some of software 720 may be communicated internally or externally. Storage system 713 may be implemented as a single storage device but may also be implemented across multiple storage devices or sub-systems co-located or distributed relative to each other. Storage system 713 may comprise additional elements, such as a controller, capable of communicating with processor 711 or possibly other systems.

Communication interface system 714 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media. Communication interface system 714 may include user interface elements, such as programming registers, status registers, control registers, APIs, or other user-facing preference elements. In some implementations, the user interface elements permit the user to specify the charge rate preference from a set of preferences, provide voice input to select a preference from a set of preferences, or provide input in some other manner to select the preference.

Communication between computing system 710 and other computing systems (not shown), may occur over a communication network or networks and in accordance with various communication protocols, combinations of protocols, or variations thereof. Communication interfaces might also include interfaces for communicating internally or externally to computing system 710 and comprise system management bus (SMB) interfaces, inter-integrated circuit (I2C) interfaces, or other similar interfaces. Further examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Software 720 may be implemented in program instructions and among other functions may, when executed by processor 711, direct processor 711 to operate as described with respect to the various operational scenarios, sequences, and processes illustrated herein. For example, software 720 may include program instructions for enhanced charging of a battery in a computing system, power control operations of a computing system, temperature regulation operations of a computing system, or other operations. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 720 may include additional processes, programs, or components, such as operating system software or other application software, in addition to that of charge rate control system 721. Software 720 may also comprise software or some other form of machine-readable processing instructions executable by processor 711.

In general, software 720 may, when loaded into processor 711 and executed, transform a suitable apparatus, system, or device (of which computing system 710 is representative) overall from a general-purpose computing system into a special-purpose computing system customized to facilitate enhanced battery charging management of computing system 710. Indeed, encoding software 720 on storage system 713 may transform the physical structure of storage system 713. The specific transformation of the physical structure may depend on various factors in different implementations of this description. Examples of such factors may include, but are not limited to, the technology used to implement the storage media of storage system 713 and whether the computer-storage media are characterized as primary or secondary storage, as well as other factors. For example, if the computer readable storage media are implemented as semiconductor-based memory, software 720 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Charge rate control system 721 can include one or more software elements, such as an operating system, devices drivers, and one or more applications. These elements can describe various portions of computing system 710 with which power controllers, power supply status elements, battery status elements, temperature monitoring circuitry, control nodes, telemetry elements, or other elements interact. For example, an operating system can provide a software platform on which charge rate control system 721 is executed and allows for enhanced control of battery charging operations of computing system 710.

In one example, mode selector 722, when executed by processor 711, directs computing system 710 to identify a user selection indicating a charge rate preference for a battery of computing system 710 when supplied with power from a power supply. The user selection might be provided via a preference menu on a visual display of computing system 710, provided via voice or text input provided by the user of computing system 710, or provided in some other manner, such as by a neural network predictive or pattern-based selection.

Based at least on the user selection, power allocator 723 directs computing system 710 to bias allocation of a power supply capacity to charging of a battery of computing system 710 while providing the processing system with a power capacity remainder. The biasing of the power capacity is based at least on the user selection, among other factors. For example, if the user selects a preference for charging the battery of computing system 710, then power capacity will be biased toward charging the battery over providing power to other systems (e.g., processor 711) of computing system 710. The allocation can be adjusted dynamically according to operating conditions including various control inputs 731 shown in FIG. 7, among other control inputs discussed herein.

For example, the user mode selection noted for mode selector 722 can be one factor in the allocation, which may provide a sliding scale or graduated scale to allocate system power towards charge rate vs. system performance. Skin temperature targets can also be considered, which can be altered or adjusted to provide for more thermal headroom for the battery to be charged at a higher allocation or for a longer time at a higher allocation. The battery charge level can relate to how much charge is remaining in the battery or how much charge the battery can take before being fully charged, and this can affect the maximum charge rate of the battery and associated power allocation limits. The battery temperature can similarly affect the maximum charge rate of the battery, and changes with temperature of the battery, whether from ambient temperature or temperature rises due to charging operations. The state of displays or standby/sleep/hibernate modes can also affect the allocation. For example, when computing system 710 is placed into a standby/sleep/hibernate mode or when the display is off, then additional power can be allocated to charging the battery. Finally, the capacity of the power supply to provide power to computing system 710 can set an ultimate limit on the allocations, where the total capacity of the power supply relates to the sum of the allocation given to the battery charging operations and the remainder allocation.

Mitigator 724 directs computing system 710 to initiate temperature mitigation operations. These can include dynamically increasing or decreasing skin temperature threshold limits, or adjusting other temperature thresholds to allow the battery to reach or maintain a target charge rate. In some implementations, the user selection of the charge rate preference can trigger temperature threshold adjustments on computing system 710. Also, during operation and charging of the battery, temperatures can be monitored by mitigator 724 for the computing system. Temperature mitigation operations include increasing a fan speed, throttling power to a system processor, or providing some other mitigation operation to support the desired preference associated with the charge rate. For example, based at least on the temperature of the battery or chassis, mitigator 724 can reduce the power supplied to the processor or clock rate of the processor of computing system 710 in an attempt to reduce the temperature.

Various control outputs can be associated with mitigator 724, such as control outputs 732 shown in FIG. 7. These control outputs include charge rate limits to limit temperature rise due to battery charging operations, system power limits to limit total power dissipation by computing system 710, fan speed changes to alter, enable, or otherwise adjust speeds or airflow rates of fans of computing system 710 (or similarly, rates of other cooling system elements), and finally processor throttling (power dissipation limiting or clock frequency adjustment). Mitigator 724 thus directs computing system 710 to alter the allocation of power supply capacity responsive to at least monitored temperatures reaching additional levels. In some examples, initial mitigation operations can include fan speed and a throttling of the CPU, and these are unable to reduce the monitored temperatures to a desired temperature range. When a second temperature threshold is reached, mitigator 724 can adjust or alter the allocation of power to charging the battery to support the temperature mitigation of computing system 710.

Certain inventive aspects may be appreciated from the foregoing disclosure, of which the following are various examples.

Example 1: A method comprising identifying a preference level for battery charging performance for a computing system when supplied by a power supply having a power supply capacity. Based at least on the preference level, allocating the power supply capacity to bias a primary allocation of the power supply capacity to charging operations of a battery of the computing system while providing a remainder allocation to at least a system processor of the computing system.

Example 2: The method of example 1, comprising applying an increased temperature limit associated with an exterior surface temperature of the computing system to maintain the primary allocation for charging operations of the battery.

Example 3: The method of examples 1-2, comprising, responsive to reaching the increased temperature limit during the charging operations of the battery, selecting at least one among reducing the primary allocation to reduce the exterior surface temperature to below the increased temperature limit, increasing a fan speed of the computing system to reduce the exterior surface temperature to below the increased temperature limit, or enacting a performance limit on the system processor of the computing system to reduce the exterior surface temperature to below the increased temperature limit.

Example 4: The method of examples 1-3, wherein enacting the performance limit comprises adjusting at least one among a clock frequency reduction or workload limit for the system processor.

Example 5: The method of examples 1-4, comprising determining the increased temperature limit as one or more incremental adjustments in accordance with at least a charging rate capacity of the battery, wherein the charging rate capacity relates to at least one among a relative state of charge (RSOC) of the battery, a charging mode of the battery, or a temperature of the battery.

Example 6: The method of examples 1-5, wherein the charging mode of the battery comprises one or more modes selected from among a trickle charge mode, a slow charge mode, or a normal charge mode.

Example 7: The method of examples 1-6, wherein biasing the primary allocation to charging operations of the battery comprises providing a larger allocation of the power supply capacity to the charging operations than provided to the remainder allocation.

Example 8: The method of examples 1-7, comprising determining a minimum amount for the remainder allocation based at least on a minimum processor power state for the system processor of the computing system.

Example 9: The method of examples 1-8, comprising receiving user input indicating the preference level from among a set of preference levels corresponding at least to battery charging preferred or system processor performance preferred.

Example 10: The method of examples 1-9, comprising identifying charge trends associated with the computing system from at least previous connection states of the power supply to a source power, or identifying a preference level for battery charging performance based at least on a prediction of an upcoming disconnection of the power supply to the source power.

Example 11: The method of examples 1, comprising determining the power supply capacity based at least on properties of the power supply when coupled to the computing system, and determining the allocation of the power supply capacity based at least on percentages of the power supply capacity.

Example 12: An apparatus, comprising a processing system operatively coupled with one or more computer readable storage media, and program instructions stored on the one or more computer readable storage media. Based at least on being read and executed by the processing system, the program instructions direct the processing system to at least identify a preference level for battery charging performance for a computing system when supplied by a power supply having a power supply capacity. Based at least on the preference level, the program instructions direct the processing system to allocate the power supply capacity to bias a primary allocation of the power supply capacity to charging operations of a battery of the computing system while providing a remainder allocation to at least a system processor of the computing system.

Example 13: The apparatus of example 12, comprising program instructions that further direct the processing system to at least apply an increased temperature limit associated with an exterior surface temperature of the computing system to maintain the primary allocation for charging operations of the battery.

Example 14: The apparatus of examples 12-13, comprising program instructions that further direct the processing system to at least, responsive to reaching the increased temperature limit during the charging operations of the battery, select at least one among reduce the primary allocation to reduce the exterior surface temperature to below the increased temperature limit, increase a fan speed of the computing system to reduce the exterior surface temperature to below the increased temperature limit, or enact a performance limit on the system processor of the computing system to reduce the exterior surface temperature to below the increased temperature limit.

Example 15: The apparatus of examples 12-14, wherein enacting the performance limit comprises adjusting at least one among a clock frequency reduction or workload limit for the system processor.

Example 16: The apparatus of examples 12-15, comprising program instructions that further direct the processing system to at least determine an increased temperature limit as one or more incremental adjustments to the temperature limit in accordance with at least a charging rate capacity of the battery, wherein the charging rate capacity relates to at least one among a relative state of charge (RSOC) of the battery or a charging rate mode of the battery.

Example 17: The apparatus of examples 12-16 comprising program instructions that further direct the processing system to at least receive user input indicating the preference level from among a set of preference levels corresponding at least to battery charging preferred or system processor performance preferred.

Example 18: The apparatus of examples 12-17, comprising program instructions that further direct the processing system to at least identify charge trends associated with the computing system from at least previous connection states of the power supply to a source power, and identify a preference level for battery charging performance based at least on a prediction of an upcoming disconnection of the power supply to the source power.

Example 19: The apparatus of examples 12-18, comprising program instructions that further direct the processing system to at least determine the power supply capacity based at least on properties of the power supply when coupled to the computing system, or determine the allocation of the power supply capacity based at least on percentages of the power supply capacity.

Example 20: A system, comprising a user interface configured to identify a preference level for battery charging performance for a computing system when supplied by a power supply having a power supply capacity and a power control system. The power control system is configured to, based at least on the preference level, allocate the power supply capacity to bias a primary allocation of the power supply capacity to charging operations of a battery of the computing system while providing a remainder allocation to at least a system processor of the computing system. The power control system is configured to apply an increased temperature limit associated with an exterior surface temperature of the computing system to maintain the primary allocation for charging operations of the battery. Responsive to reaching the increased temperature limit during the charging operations of the battery, the power control system is configured to select at least one among reduce the primary allocation to reduce the exterior surface temperature to below the increased temperature limit, increase a fan speed of the computing system to reduce the exterior surface temperature to below the increased temperature limit, or enact a performance limit on the system processor of the computing system to reduce the exterior surface temperature to below the increased temperature limit.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The various materials and manufacturing processes discussed herein are employed according to the descriptions above. However, it should be understood that the disclosures and enhancements herein are not limited to these materials and manufacturing processes and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method comprising:
    identifying a preference level for battery charging performance for a computing system when supplied by a power supply having a power supply capacity;
    based at least on the preference level, allocating the power supply capacity to bias a primary allocation of the power supply capacity to charging operations of a battery of the computing system while providing a remainder allocation to at least a system processor of the computing system; and
    applying an increased temperature limit associated with an exterior surface temperature of an enclosure of the computing system to maintain the primary allocation for charging operations of the battery.

2. The method of claim 1, comprising:
    responsive to reaching the increased temperature limit during the charging operations of the battery, selecting at least one among:
        reducing the primary allocation to reduce the exterior surface temperature to below the increased temperature limit;
        increasing a fan speed of the computing system to reduce the exterior surface temperature to below the increased temperature limit; or
        enacting a performance limit on the system processor of the computing system to reduce the exterior surface temperature to below the increased temperature limit.

3. The method of claim 2, wherein enacting the performance limit comprises adjusting at least one among a clock frequency reduction or workload limit for the system processor.

4. The method of claim 1, comprising:
    determining the increased temperature limit as one or more incremental adjustments in accordance with at least a charging rate capacity of the battery, wherein the charging rate capacity relates to at least one among a relative state of charge (RSOC) of the battery, a charging mode of the battery, or a temperature of the battery.

5. The method of claim 4, wherein the charging mode of the battery comprises one or more modes selected from among a trickle charge mode, a slow charge mode, or a normal charge mode.

6. The method of claim 1, wherein biasing the primary allocation to charging operations of the battery comprises providing a larger allocation of the power supply capacity to the charging operations than provided to the remainder allocation.

7. The method of claim 1, comprising:
    determining a minimum amount for the remainder allocation based at least on a minimum processor power state for the system processor of the computing system.

8. The method of claim 1, comprising:
    receiving user input indicating the preference level from among a set of preference levels corresponding at least to battery charging preferred or system processor performance preferred.

9. The method of claim 1, comprising:
    identifying charge trends associated with the computing system from at least previous connection states of the power supply to a source power; and
    identifying a preference level for battery charging performance based at least on a prediction of an upcoming disconnection of the power supply to the source power.

10. The method of claim 1, comprising:
    determining the power supply capacity based at least on properties of the power supply when coupled to the computing system; and
    determining the allocation of the power supply capacity based at least on percentages of the power supply capacity.

11. An apparatus, comprising:
    a processing system operatively coupled with one or more computer readable storage media; and
    program instructions stored on the one or more computer readable storage media that, based at least on being read and executed by the processing system, direct the processing system to at least:
    identify a preference level for battery charging performance for a computing system when supplied by a power supply having a power supply capacity;
    based at least on the preference level, allocate the power supply capacity to bias a primary allocation of the power supply capacity to charging operations of a battery of the computing system while providing a remainder allocation to at least a system processor of the computing system; and
    apply an increased temperature limit associated with an exterior surface temperature of an enclosure of the computing system to maintain the primary allocation for charging operations of the battery.

12. The apparatus of claim 11, comprising program instructions that further direct the processing system to at least:

responsive to reaching the increased temperature limit during the charging operations of the battery, select at least one among:
reduce the primary allocation to reduce the exterior surface temperature to below the increased temperature limit;
increase a fan speed of the computing system to reduce the exterior surface temperature to below the increased temperature limit; or
enact a performance limit on the system processor of the computing system to reduce the exterior surface temperature to below the increased temperature limit.

13. The apparatus of claim 12, wherein enacting the performance limit comprises adjusting at least one among a clock frequency reduction or workload limit for the system processor.

14. The apparatus of claim 11, comprising program instructions that further direct the processing system to at least:
determine the increased temperature limit as one or more incremental adjustments to the temperature limit in accordance with at least a charging rate capacity of the battery, wherein the charging rate capacity relates to at least one among a relative state of charge (RSOC) of the battery or a charging rate mode of the battery.

15. The apparatus of claim 11, comprising program instructions that further direct the processing system to at least:
receive user input indicating the preference level from among a set of preference levels corresponding at least to battery charging preferred or system processor performance preferred.

16. The apparatus of claim 11, comprising program instructions that further direct the processing system to at least:
identify charge trends associated with the computing system from at least previous connection states of the power supply to a source power; and
identify a preference level for battery charging performance based at least on a prediction of an upcoming disconnection of the power supply to the source power.

17. The apparatus of claim 11, comprising program instructions that further direct the processing system to at least:
determine the power supply capacity based at least on properties of the power supply when coupled to the computing system; and
determine the allocation of the power supply capacity based at least on percentages of the power supply capacity.

18. A system, comprising:
a user interface configured to identify a preference level for battery charging performance for a computing system when supplied by a power supply having a power supply capacity; and
a power control system configured to:
based at least on the preference level, allocate the power supply capacity to bias a primary allocation of the power supply capacity to charging operations of a battery of the computing system while providing a remainder allocation to at least a system processor of the computing system;
apply an increased temperature limit associated with an exterior surface temperature of an enclosure of the computing system to maintain the primary allocation for charging operations of the battery; and
responsive to reaching the increased temperature limit during the charging operations of the battery, select at least one among:
reduce the primary allocation to reduce the exterior surface temperature to below the increased temperature limit;
increase a fan speed of the computing system to reduce the exterior surface temperature to below the increased temperature limit; or
enact a performance limit on the system processor of the computing system to reduce the exterior surface temperature to below the increased temperature limit.

* * * * *